Sept. 22, 1964    A. J. SCALORA ETAL    3,150,214
METHOD OF EXTRUDING A FOAMED PLASTIC COMPOSITION
Filed Nov. 23, 1959
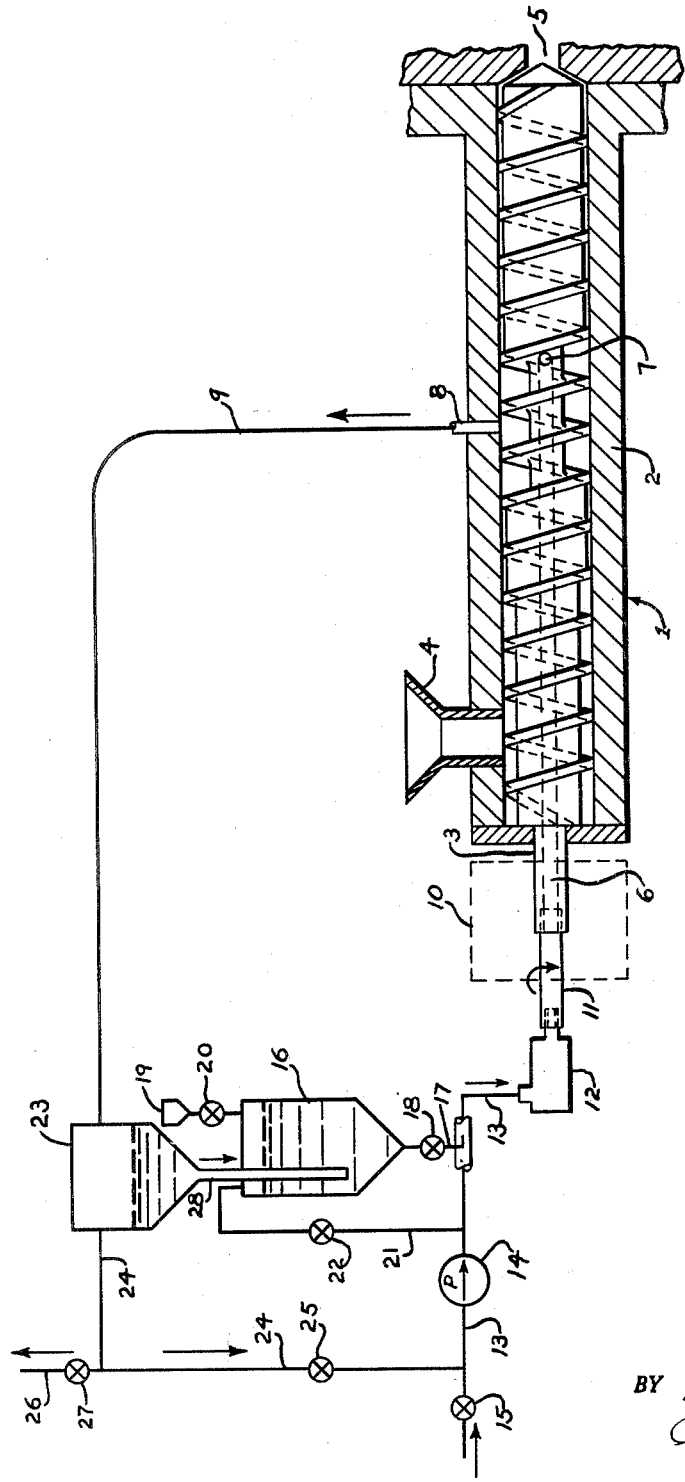
INVENTORS
A. J. SCALORA &
G. S. SCARVELIS
BY W. A. Schaich &
Charles S. Lynch
ATTORNEYS

United States Patent Office 3,150,214
Patented Sept. 22, 1964

3,150,214
METHOD OF EXTRUDING A FOAMED
PLASTIC COMPOSITION
Anthony J. Scalora and Gus S. Scarvelis, Toledo, Ohio, assignors to Owens-Illinois Glass Company, a corporation of Ohio
Filed Nov. 23, 1959, Ser. No. 854,703
5 Claims. (Cl. 264—53)

This invention relates generally to a method of extruding an expandable plastic composition. In another aspect the invention relates to a method for the production of a partially expanded but further expandable plastic composition. In still another aspect the invention relates to a method for producing a partially expanded but still expandable plastic composition. In another aspect the invention relates to a method for producing an expanded plastic. In still another specific aspect the invention relates to a method for incorporating a solid foaming agent in a plastic while at the same time introducing and incorporating a normally gaseous foaming agent into the plastic.

As is well known in many plastic molding operations for forming plastic shapes by extrusion or by injection molding methods, an extruder-plasticizer is employed both to plasticize and to convey the plastic material to an extrusion die or to a molding apparatus, such as an injection molding apparatus. In the production of foamed or foamable plastic articles or shapes one common type of foaming agent is a solid chemical agent which is incorporated in the plastic and which will undergo chemical reaction or decomposition to form a gas which serves as the foaming agent to foam the plastic. These solid foaming agents have in the past been incorporated into the plastic by mixing finely divided foaming agent and particulate plastic in a ribbon mixer or mechanical mixer in a separate step. This separate step is expensive and, moreover, does not always result in a uniform admixture. While gaseous foaming agents have been incorporated into plastic masses directly in an extruder, no satisfactory method has been developed for uniform incorporation of a solid foaming agent in an extruder.

Accordingly, one object of the invention is to provide methods for incorporating a finely divided or particulate solid chemical foaming agent into a plastic mass while undergoing extrusion in an extruder.

A further object of the invention is to concomitantly incorporate both a finely divided solid foaming agent and a gaseous foaming agent into a plastic mass while it is undergoing extrusion.

Still another object of the invention is to provide a method for making a partially expanded plastic mass containing normally gaseous foaming agent, said mass being capable of further expansion and containing dispersed therein solid finely divided chemical foaming agent.

Another object of the invention is to provide a method for forming such a plastic mass.

Still another object of the invention is to provide a method of producing a foamed or cellular plastic mass by the foaming action of both a normally gaseous and a solid chemical foaming agent.

Other objects, as well as aspects and advantages, of the invention will be understood from a study of the specification and drawings.

According to one aspect of the invention there is provided a method which comprises conveying a finely divided solid chemical foaming agent as a suspension in a gaseous foaming agent into contact with a hot plasticized plastic undergoing extrusion in an extrusion zone, incorporating solid foaming agent and a portion of said gaseous foaming agent in said plastic during said extrusion, and passing the resulting admixture from said extrusion zone.

In one embodiment of the foregoing method the solid foaming agent is one which does not decompose in the extrusion zone because its decomposition temperature is too high. When the plastic admixture is passed to a zone of low pressure after leaving the extrusion zone, a partially foamed plastic composition results, containing cells resulting from action of the gaseous foaming agent, but capable of being further foamed because of undecomposed solid chemical foaming agent dispersed therein.

In another embodiment of the method the solid chemical foaming agent decomposes in situ in the extrusion zone to release a further gaseous foaming agent.

The various aspects of the invention will be better understood from a study of the following detailed description of the drawing.

The figure is a diagrammatic illustration of one form of apparatus in which a process according to the invention can be practiced. Extruder-plasticizer 1 is a modification of a common form of extruder having a section of reduced root diameter in the screw to provide for degassing. Such an extruder is shown, for instance, on page 22 of the Technical Bulletin E-3 of the Prodex Corporation, Fords, New Jersey, 2nd edition. In cylindrical barrel 2 there is fitted a screw device 3. A charging hopper 4 communicates with the interior of the extruder, as shown. It will be noted that the screw device illustrated has four sections: the first section at the left is known as the plasticizing section, the next section is the metering or throttling section and has root diameter larger than the first section, the next section is a section in which the root diameter is considerably reduced from the previous section, as shown. In this section the plastic will not completely fill the space between the screw and the barrel. This is because the drag flow capacity in the third section is greater than in the section preceding it. Drag flow capacity is defined in Industrial and Engineering Chemistry, May 1953, on page 974. In the last section the plastic is further worked and is delivered to the outlet opening 5 by this last section of the screw which has a root diameter greater than the previous section, but equal to or smaller than the root diameter in the second or metering section. Opening 5 can be a die delivering the extruded plastic to a zone of low pressure, such as to the atmosphere, or it can be an opening or passageway which delivers the plastic under pressure to further handling, for instance, to the feed barrel of an injection molding or ram extrusion machine such as the machines shown in U.S. Patent 2,804,654, or the machines disclosed in copending application Serial No. 847,144 to Santelli filed October 19, 1959.

The increase in root diameter from the first and second sections of the screw can be abrupt as illustrated or can gradually increase over an appreciable distance from one section to the other, as is understood by those skilled in the art. The dotted line 6 indicates an elongated opening located substantially axially in the screw device 3. This opening terminates in the opening or orifice 7 which communicates with the interior of the extruder in the section of reduced cross-sectional area which does not become filled with plastic, preferably in the forward half of a space between threads in this area. The opening is, in fact, usually located as shown shortly behind one of the forward threads in this section. The plastic in this section of reduced root diameter tends to accumulate toward the rear of the spaces between the threads of the screw in this section, leaving free space in the forward portion. In this same third section of the screw device having reduced root diameter, there is located a lateral passageway 8 which communicates with line or conduit 9.

The conventional drive unit location is indicated diagrammatically by the dotted line area 10. Conduit 11 connects with the bore of the passageway 6 in the screw device 3 and connects at the other end with a rotating union 12. An example of such a union is Model 10 of the Deublin Company, 1919 Stanley Street, Northbrook, Illinois, illustrated in the catalog of that company, entitled "Deublin Rotating Unions," copyright 1959. The outlet of the stator of the union communicates with a conduit 13 in which is located blower or compresser 14 and valve 15. Closed vessel 16 is for storage and feeding of finely divided solid chemical blowing agent. It communicates with conduit 13 through conduit 17 containing valve 18. Hopper 19 containing valve 20 on its lower end communicates with vessel 16 for charging solid foaming agent thereto. A relatively small conduit 21 containing valve 22 is provided for balancing pressures between line 13 and the interior of vessel 16. Conduit 9 connects passageway 8 with settling vessel 23. Conduit 24 containing valve 25 connects conduit 13 between valve 15 and blower 14 with settling vessel 23. Conduit 26 containing valve 27 connects conduit 24 with the atmopshere. Settler vessel 23 communicates with vessel 15 by dip leg 28.

Where desired in order to more accurately control the temperature the barrel 2 can be conventionally heated by electric coils, steam coils, etc.

In operation, drive means 10 rotates the screw device 3 in the direction indicated by the arrow and a granular organic plastic material is introduced into the extruder-plasticizer 1 through hopper 4. The plastic advances through the before-mentioned zones of the extruder and is plasticized and becomes heated to a soft, viscous plastic condition. An inert gas such as air, nitrogen, carbon dioxide or the like is introduced through line 13, valve 15, blower 14, rotating union 12, and conduit 11 into bore 6 and thence into the space in the extruder through passageway 7. As the gaseous medium passes through line 13 it picks up and suspends powdered foaming agent delivered through line 17, valves 18 and 22 being open. Thus, a suspension of the powdered or finely divided foaming agent in the gaseous medium is passed into the extruder through passage 7. In the extruder finely divided foaming agent so introduced becomes imtimately admixed with the plastic. Also, a portion of the gaseous medium also becomes dispersed in the resin, either by solution or other physical association resulting in a substantially homogeneous dispersion. Since a great deal more gaseous medium is required to effectively suspend and convey the solid chemical foaming agent than is dispersed or dissolved in the plastic, the excess gaseous medium is withdrawn through passageway 8 and line 9 to a settling vessel 23. Settling vessel 23 is provided to cause separation from the gas of any small portion of the solid foaming agent not picked up by the plastic in the extruder. Although merely an enlarged vessel is shown for slowing down the velocity and thus allowing the foaming agent to settle out, any other suitable means for separating the solids from the gaseous medium can be employed. The solid foaming agent then flows downwardly through line 28 into vessel 16. A level of solids is preferably maintained in vessel 23 in order to provide a head to overcome any pressure difference between the two vessels. The gas now substantially free of the solids exists through line 24, open valve 25, back to line 13 on the suction side the blower. Valve 15 is open only sufficiently to provide the necessary make-up air or other gas.

In some cases the separation means 23 can be omitted and the solids allowed to recycle through the blower. In this case a type of blower or pump is chosen which can handle a mixture of gases and solids.

The gaseous introduction system of the invention can be operated so that the pressure within the spaces in the third section of the extruder is at a pressure anywhere from atmospheric, or even below atmospheric, to pressures of several hundred pounds, for instance, 500 lbs. per square inch absolute, or even much higher.

There are two distinct embodiments of the method of the invention. In one embodiment the blowing agent is chosen so that it is not activated or decomposed under the time-temperature conditions encountered in the extruder so that the plastic issuing to a zone of low pressure following the extruder foams by the action of the blowing agent initially introduced in the gaseous form through line 13, but contains the still solid and undecomposed foaming agent dispersed therein. This produces what can be termed a preexpanded plastic shape, which can be further expanded by exposure of the composition to conditions of time and temperature above the decomposition temperature of the solid foaming agent, as by insertion in a zone heater by steam or other gaseous medium, or insertion in a heated mold. As will be understood, the extent of the preexpansion by the initially gaseous foaming agent will depend for any particular foaming agent on the pressure employed in the gaseous phase in the third section of the extruder, very low gaseous pressure resulting in the incorporation of only small amounts of gaseous medium in the plastic, with a consequent low degree of foaming on issuing to a zone of lower pressure of the plastic from the extruder. Increasingly higher pressures will result in an increasingly higher degree of foaming from the gaseous foaming agent.

In the second method of the invention a solid foaming agent is employed which does decompose under the time-temperature conditions encountered in the extruder so that the plastic on issuing from passageway 5 to a zone of lower pressure expands both from the action of the initially gaseous foaming agent and the gas generated from the solid foaming agent.

Thus, as an example of the first embodiment of the method described with respect to the figure, the plastic employed is a thermoplastic, specifically low density polyethylene having a specific gravity of 0.915, and the solid foaming agent employed is 1,1'-azobis (formamide), employing 3 weight percent of the solid foaming agent based on the plastic. Maximum temperature developed in the extruder is 290° F. Gaseous pressure employed in the third section of the screw is 120 p.s.i.a. The polyethylene extruded through passageway 5 into the atmosphere in the form of a rod is a partially foamed product due to the gaseous foaming agent, in this case nitrogen introduced through line 13 to the system, but contains solid foaming agent not yet decomposed. It is later placed in a heated mold for a period of ten minutes at a temperature of 330° F., whereupon the solid foaming agent decomposes and further expands the rod to the dimensions of the mold, following which the mold is cooled to produce a solid foamed polyethylene structure.

In an example of the second method of operation the same plastic and gaseous foaming agents are employed but the solid foaming agent employed is 5 weight percent of p,p'-oxybis (benzenesulfonyl hydrazide). The gas pressure employed is 100 lbs. per square inch absolute and the highest temperature reached in the extruder is about 300° F. The plastic issuing through passageway 5 to the atmospheric foams as it issues both from the gaseous nitrogen dispersed therein and the gas generated by the decomposition of the solid foaming agent in the extruder.

The apparatus shown in the figure can be modified to reverse the direction of flow of gas into and out of the extruder. Thus in such an embodiment conduit 13 can connect with passageway 8 at its end instead of connecting with rotating union 12, while line 9 can connect with rotating union 12 at its end instead of connecting with passageway 8, thus reversing the flow in the system.

Foamed products produced according to the invention are useful as insulation, as well as in the production of numerous molded articles.

While polyethylene has been used as an illustrative plastic, the method is generally applicable to foamable organic plastic materials such as polystyrene, etc.

Solid chemical foaming agents are also generally applicable although as understood in the art, the decomposition temperature of such foaming agents is chosen to correlate the working temperature employed with the particular plastic composition being processed. Inorganic foaming agents, such as sodium bicarbonate, are applicable as well as organic compounds. Some examples of applicable organic foaming agents are described in the 1960 Modern Plastics Encyclopedia, September 1959, page 310 et seq.

The terms "plastic" and "thermoplastic" as used herein, define any organic material which has the required condition of plasticity to permit expansion and setting in predetermined form.

As will be evident to those skilled in the art, various modifications of this invention can be made or followed in the light of the foregoing disclosure and discussion without departing from the spirit or scope of the disclosure or from the scope of the claims.

We claim:

1. A method which comprises conveying a finely divided solid chemical foaming agent as a suspension in a gaseous foaming agent into contact with a hot plasticized plastic undergoing extrusion in an extrusion zone, incorporating solid foaming agent and a portion of said gaseous foaming agent into admixture with said plastic during said extrusion, and thereafter passing said plastic from said extrusion zone.

2. A method according to claim 1 wherein the said solid foaming agent employed is one having a decomposition temperature such that it decomposes to yield a gaseous foaming agent under the time-temperature conditions employed in said extrusion, and allowing said decomposition to take place in situ in said extrusion zone.

3. A method for producing a partially foamed plastic composition containing dispersed therein solid undecomposed chemical foaming agent which comprises conveying a finely divided solid chemical foaming agent as a suspension in a gaseous foaming agent into contact with a hot plasticized plastic composition undergoing extrusion in an extrusion zone, incorporating so conveyed solid foaming agent and a portion of said gaseous foaming agent in said plastic composition during said extrusion in said extrusion zone, and passing the resulting mixture from said extrusion zone to a zone of lower pressure, thus allowing said plastic to foam by expansion of said incorporated gaseous foaming agent, said solid foaming agent being a foaming agent which does not decompose under the time-temperature conditions existing in said extrusion operation, thus producing a partially foamed plastic composition containing undercomposed solid foaming agent incorporated therein, which solid foaming agent is decomposable to form a gaseous foaming agent under more stringent time-temperature conditions than those encountered during said extrusion operation.

4. A method which comprises providing a plasticizer extruder comprising a barrel, a helical extruder-plasticizer screw conveying device mounted rotatably in said barrel, said screw having a zone of greater drag flow capacity following a zone of lesser drag flow capacity and having a passageway extending longitudinally through the shaft of said screw which communicates with said zone of greater drag flow capacity in the forward half of a channel between threads in said screw, said barrel having a passageway extending laterally through said barrel and communicating with a channel between threads in said zone of greater drag flow capacity; continuously introducing plastic to said plasticizer-extruder while rotating said screw and continuously moving said plastic through said barrel and out the forward end of said barrel; continuously passing an inert gas suspension of a solid chemical foaming agent into said zone of greater drag flow capacity through one of said passageways, thus incorporating both inert gas and solid chemical foaming agent into said plastic in said extruder-plasticizer; and continuously withdrawing a portion of said inert gas from said zone of greater drag flow capacity through the other of said passageways.

5. A method for producing a foamed plastic composition which comprises conveying a finely divided solid chemical foaming agent as a suspension in a first gaseous foaming agent into contact with a hot plasticized plastic composition undergoing extrusion in an extrusion zone, incorporating so conveyed solid foaming agent and a portion of said first gaseous foaming agent in said plastic composition during said extrusion in said extrusion zone, said solid foaming agent being a foaming agent which decomposes under the time-temperature conditions existing in said extrusion operation, allowing said decomposition to take place in situ in said extrusion zone to yield a second gaseous foaming agent which is thus incorporated in situ in said plastic composition undergoing extrusion in said extrusion zone, and thereafter passing said plastic composition from said extrusion zone to a zone of lower pressure, thus foaming said plastic composition by the expansion action of said first and second gaseous foaming agents incorporated therein.

References Cited in the file of this patent

UNITED STATES PATENTS

| | | |
|---|---|---|
| 1,948,046 | Raepsaet | Feb. 20, 1934 |
| 2,183,857 | Turkington | Dec. 19, 1939 |
| 2,363,051 | Dosmann | Nov. 21, 1944 |
| 2,394,122 | Urmston | Feb. 5, 1946 |
| 2,525,965 | Smith | Oct. 17, 1950 |
| 2,576,749 | Carpentier | Nov. 27, 1951 |
| 2,712,799 | Braibanti et al. | July 12, 1955 |
| 2,740,743 | Pace | Apr. 3, 1956 |
| 2,860,377 | Bernhardt et al. | Nov. 18, 1958 |
| 2,860,378 | Urchick | Nov. 18, 1958 |
| 2,901,774 | Pooley | Sept. 1, 1959 |
| 2,928,130 | Gray | Mar. 15, 1960 |
| 2,941,964 | Houston et al. | June 21, 1960 |
| 2,941,965 | Ingram | June 21, 1960 |